(12) United States Patent
Bruck et al.

(10) Patent No.: US 8,226,167 B2
(45) Date of Patent: Jul. 24, 2012

(54) LINEAR RECLINER ASSEMBLY WITH THREADED LINEAR DRIVE ROD AND ROTATABLY ENGAGED GEAR STOP

(75) Inventors: Stephen Bruck, Howell, MI (US); Ross Schmitz, Novi, MI (US); Bruce Zane, Holly, MI (US); Dean Moliterno, Birch Run, MI (US)

(73) Assignee: BAE Industries, Inc., Warren, MI (US)

( * ) Notice: Subject to any disclaimer, the term of this patent is extended or adjusted under 35 U.S.C. 154(b) by 384 days.

(21) Appl. No.: 12/335,068

(22) Filed: Dec. 15, 2008

(65) Prior Publication Data
US 2010/0148558 A1 Jun. 17, 2010

(51) Int. Cl.
*B60N 2/02* (2006.01)
(52) U.S. Cl. ............. 297/362.14; 297/362.12; 74/89.38; 185/37
(58) Field of Classification Search ............. 297/362.14, 297/362.12; 185/37, 38, 39, 40 R, 40 H; 74/89.38, 89.39
See application file for complete search history.

(56) References Cited

U.S. PATENT DOCUMENTS

| | | | | |
|---|---|---|---|---|
| 1,283,599 A * | 11/1918 | Thomas | ............................. | 185/37 |
| 1,769,773 A * | 7/1930 | Dejean | ............................. | 74/841 |
| 2,599,151 A * | 6/1952 | Baldwin | ............................ | 74/3.5 |
| 2,749,812 A * | 6/1956 | Wetzel | ............................ | 409/146 |
| 3,045,779 A * | 7/1962 | Rosenthai | ........................ | 185/37 |
| 3,046,055 A * | 7/1962 | Martens | ..................... | 297/362.14 |
| 3,356,411 A * | 12/1967 | Homier | ..................... | 297/362.12 |
| 3,369,841 A * | 2/1968 | Heyl, Jr. | ..................... | 297/362.14 |
| 3,398,986 A * | 8/1968 | Homier | .......................... | 297/375 |
| 3,424,492 A * | 1/1969 | Tabor | ............................. | 297/375 |
| 4,243,264 A | 1/1981 | Bell | | |
| 4,579,386 A | 4/1986 | Rupp et al. | | |
| 4,669,781 A | 6/1987 | Conroy et al. | | |
| 4,799,734 A * | 1/1989 | Periou | ....................... | 297/362.14 |
| 4,962,963 A | 10/1990 | Robinson | | |
| 5,199,764 A | 4/1993 | Robinson | | |
| 5,299,853 A * | 4/1994 | Griswold et al. | ........ | 297/362.12 |
| 5,360,256 A | 11/1994 | Miller et al. | | |
| 5,582,461 A | 12/1996 | Pickles | | |
| 5,689,995 A * | 11/1997 | Heckel, Jr. | .................... | 74/89.39 |
| 5,769,493 A | 6/1998 | Pejathaya | | |
| 5,778,733 A * | 7/1998 | Stringer | ........................... | 74/527 |
| 5,823,622 A | 10/1998 | Fisher, IV et al. | | |

(Continued)

*Primary Examiner* — David Dunn
*Assistant Examiner* — David E Allred
(74) *Attorney, Agent, or Firm* — Gifford, Krass, Sprinkle, Anderson & Citkowski, P.C.

(57) ABSTRACT

A linear recliner assembly in use with a seat having a seat back pivotally engaged relative to a seat bottom. A housing exhibits a communicating interior between a first and second ends. A drive rod is supported in linearly displaceable fashion from the first end and is secured to the seat bottom. The second end pivotally engages the seatback spaced from its pivot point. A rotatable gear located at a fixed lineal position within the housing receives the drive rod in threadably interengaged fashion. A trigger mechanism pivotally secured to the housing exhibits a downwardly biased detent communicating through an opening in the housing to seat between succeeding teeth of the gear. A spring supported within the housing contacts the drive rod. Upon release of the detent, a reclining force applied to the seatback results in displacement of the housing against the drive rod to bias the spring. The spring influencing the drive rod in a reverse direction such that, upon release of said detent when the seatback is in the reclined position, the spring influences the seatback to reverse pivot to a returned upright position.

16 Claims, 7 Drawing Sheets

U.S. PATENT DOCUMENTS

| | | | |
|---|---|---|---|
| 5,921,140 A * | 7/1999 | Lemmens | 74/473.28 |
| 5,947,560 A | 9/1999 | Chen | |
| 6,003,394 A * | 12/1999 | Heckel, Jr. | 74/89.36 |
| 6,039,399 A | 3/2000 | Whalen et al. | |
| 6,145,407 A * | 11/2000 | Rottmann | 74/502.2 |
| RE37,928 E | 12/2002 | Howard | |
| 6,761,408 B2 * | 7/2004 | Lim et al. | 297/362.12 |
| 8,113,076 B2 * | 2/2012 | Daul | 74/89.39 |

* cited by examiner

LINEAR RECLINER ASSEMBLY WITH THREADED LINEAR DRIVE ROD AND ROTATABLY ENGAGED GEAR STOP

FIELD OF THE INVENTION

The present invention relates generally to a linear recliner assembly in use with a recliner seat having a seat back pivotally engaged with a seat bottom. More specifically, the present invention discloses a manually operable recliner assembly including an exteriorly threaded drive rod inter-engaged with one or more interiorly threaded and rotating gear stop elements. The drive rod is displaced in a first direction within the assembly housing, consistent with a seat occupant physically reclining the seat back, an inner end bushing secured to the rod compressing against an interiorly positioned spring. Upon re-triggering the release of the gear stop elements, the compressed spring influences the drive rod in a reverse linear extending fashion from the housing, thereby influencing the seat back to a reverse pivoting and upright position.

BACKGROUND OF THE INVENTION

The prior art is documented with examples of linear seat recliners. As is further known, most such seat recliners require a power input in order to cycle such as a threaded rod which influences a seat back pivotally connected to a frame location of a seat bottom.

Examples of such power linear seat recliner assemblies are set forth in U.S. Pat. Nos. 5,199,764 and 4,962,963, both to Robinson, and which controllably adjusts the angular position of a seat back relative to a seat cushion. A master recliner mechanism includes an integrally mounted motor, a slave recliner mechanism, and an actuator cable connecting the slave and master recliner mechanisms for transmitting torque from the motor to the slave recliner mechanism. The motor simultaneously drives each of the recliner mechanisms, each of which having a threaded rod assembly interconnected to a transmission assembly for providing desired speed reduction and linear reciprocal movement of the rod.

Additional manual linear type seat recliners are known and include such as that disclosed in Conroy U.S. Pat. No. 4,669,781 which teaches a polygonal cross sectional shaped rod pivotally connected to the seat back. A nut exhibits a generally fixed position relative to the seat cushion and threadably engages around the rod. The nut is movable to first and second angular positions relative to the rod such that, and in the first position, the nut engages the rod at the threaded apices to lock the rod in position relative to the nut. Upon being rotated to the second position, the rod is released for adjusting the angular position of the seat back.

Also shown in Pickles U.S. Pat. No. 5,582,461 is an infinitely adjustable linear actuator which adjusts the relative position of two relatively movable components of a vehicle seat. The linear actuator includes a rotatable element fixedly mounted about a threaded shaft. First and second moving members are mounted within a housing, disposed on opposite sides of an annular collar formed on the rotatable element. The moving members are movable between a first position in which they disengage the rotatable element from bearing surfaces at opposite ends of the housing to form a high rotational resistance connection preventing rotation of the rotatable element and the interconnected threaded shaft and a second position in which the moving members are spaced from the rotatable element to enable the rotatable element to move axially into low resistance engagement with the bearings in the housing to enable free rotation of the rotatable element and the threaded shaft.

SUMMARY OF THE INVENTION

The present invention discloses a manually operable linear recliner assembly in use with a recliner seat having a seat back pivotally engaged seat bottom. More specifically, the present invention discloses a manually operable recliner assembly including an exteriorly threaded drive rod inter-engaged with one or more interiorly threaded and rotating gear stop elements.

The linear recliner assembly is pivotally engaged relative to a seat bottom. A housing body exhibits a communicating interior between a first and second ends. A drive rod is supported in linearly displaceable fashion from the first end and is secured to such as a frame location of the seat bottom. The second end pivotally engages the seat back at a location spaced from its pivot point.

A rotatable gear is located at a fixed lineal position within the housing and receives the drive rod in threadably inter-engaged fashion. A trigger mechanism is pivotally secured to an exterior of the housing and exhibits a downwardly biased detent communicating through an opening in the housing to seat between succeeding teeth of the gear. A spring supported within the housing contacts the drive rod. Upon release of the detent, an external reclining force applied to the seat back results in displacement of the housing against the drive rod to bias the spring. The spring influences the drive rod in a reverse direction such that, upon release of said detent when the seat back is in the reclined position, the spring influences the seat back to reverse pivot to a returned upright position.

Additional features include the housing exhibiting a central tubular portion with a first end cap through which slidably displaces the drive rod and a second end cap which is pivotally mounted to the seat back. A secondary housing includes a trigger support portion and slidably inserts in coaxially fitting fashion within the central tubular portion, and in particular a linear extending recess associated with the central tubular portion through which projects the trigger support portion.

A cable attachment bracket secures to the central tubular portion in proximity to the trigger mechanism and to which is mounted a fixed outer sheath portion of a cable, with an inner translating portion extending from the outer sheath and engaging a clip secured to an upper projecting location of the trigger mechanism. A pair of torsion springs are secured upon opposing sides of a pivotal axis defining support pin, this extending crosswise through the trigger support portion and the trigger mechanism. In this fashion, the detent is continually biased in downward engaging direction with the rotatable gear teeth to restrain rotation of the gear to linear displacement of the drive rod, and unless the cable is triggered (such as by a remotely located lever) in order to move the seat back between the reclined and upright position.

Other features associated with the present design include such as the provision of (eccentric) load supporting thrust bearings arranged on either side of the rotatable gear, as well as a support bushing positioned in end facing contact with a selected thrust bearing. Other features include a cylindrical shaped drive support portion secured to an end face of the rotatable gear, as well as an end bushing secured to an interiorly extending end of the drive rod, this including an exposed end face which biases against the extending coiled ends of the compressible spring.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Referring now to the several illustrations, the present invention discloses a manually operable linear recliner assembly in use with a recliner seat having a seat back pivotally engaged relative to a seat bottom. More specifically, the present invention discloses a manually operable recliner assembly including, most broadly, an exteriorly threaded and linearly displaceable drive rod threadably inter-engaged with a stationary positioned and rotating gear supported within the recliner assembly and which is selectively permitted to rotate by an engaging trigger mechanism.

In combination with a biasing coil spring contained with the housing, relative linear motion of the drive rod relative to the housing (caused by a seat occupant manually reclining the seat back) results in the spring being compressed. Upon re-triggering the release of the gear in the reclined position, the spring causes the drive rod to displace in an opposite direction, corresponding to an upright return position of the seat back.

Advantages associated with the present design include the ability to effectively recline the seat back manually, while facilitating the compressed spring force for returning the seat back to the upright design position, this saving dramatically on the expense and requirements of other powered seat variants. Additional advantages include the high cycling capabilities of the system, this maintaining lie integrity of the design after repeated recline to upright return iterations. In this fashion, the construction of the manual recliner assembly is such that it provides a durable assembly which can endure numerous cycling requirements over a long life.

While not limited to any one type of application, it is farther understood and envisioned that the linear recliner assembly can be incorporated into any type of seat design not limited to vehicular applications, and in which seat back upright return is desired without requiring additional physical input. Such applications can include airline seats, as well as use in furniture and in addition to contemplated vehicle uses.

Figure 1:
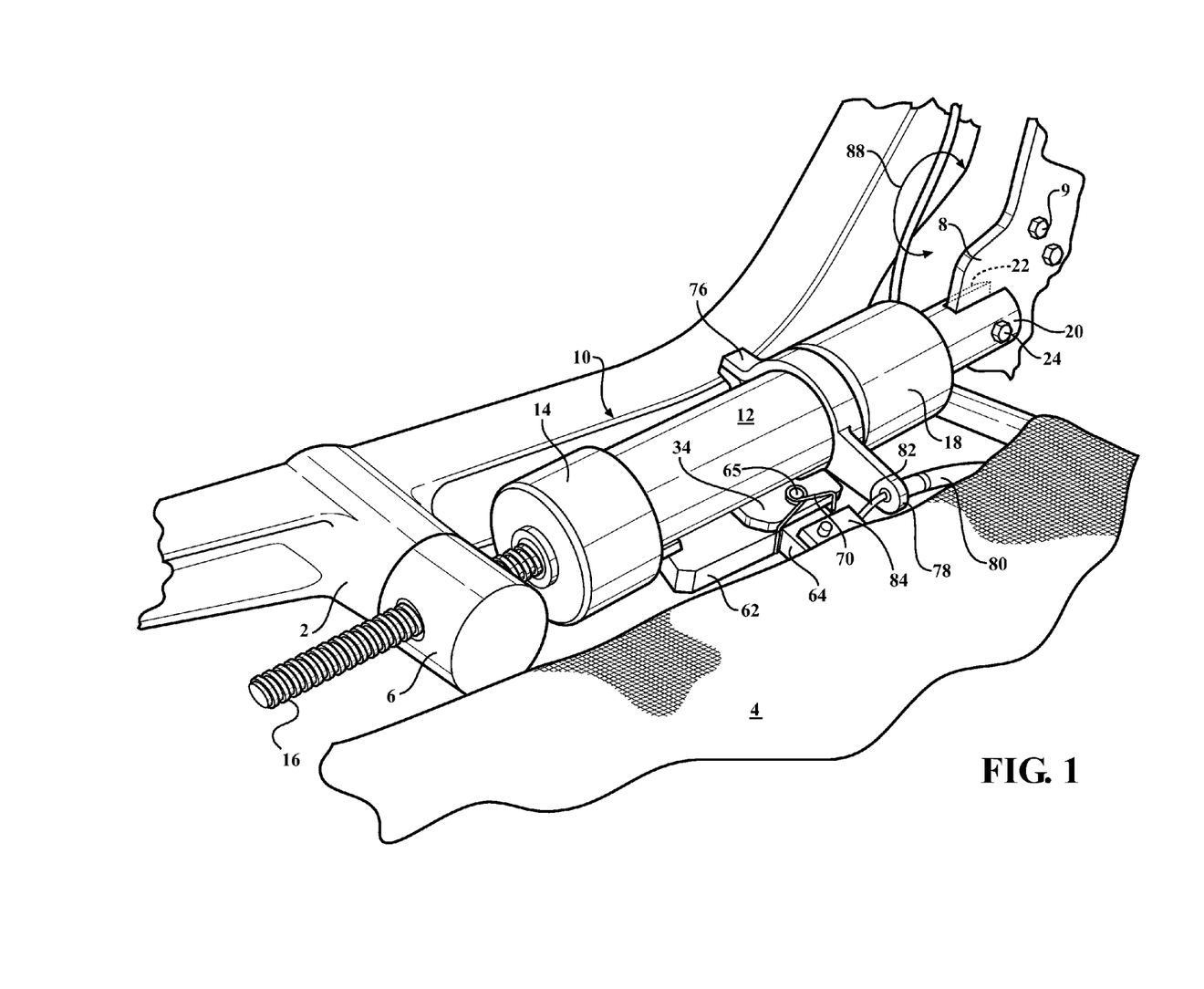
FIG. 1 is an operational view illustrating the linear recliner assembly fixedly secured at a forward end to a frame location of a seat bottom, and at an opposite rearward end to a lower-most reverse pivoting location of a pivotally secured seat back.

Referring to FIG. 1, an operational view is illustrated at 10 the linear recliner assembly fixedly secured at a forward end to a frame location 2 of a seat bottom 4. A rotating coupling is illustrated at 6 mounted over the fixed frame location 2, the coupling receiving the forward mounting end of the recliner assembly. Further illustrated at 8 is a generally lower-most extending location of a seat back, this being arranged a spaced distance from a pivot point 9 of the seat back, and such that, upon reclining of the seat back, the lower-most location will reverse pivot (i.e. exhibit a rotating direction opposite to that of the upper seat back) in a force exerting direction towards the assembly 10. In this fashion, the linear recliner assembly is pivotally engaged relative to a seat bottom at both the forward seat frame mounted coupling 6 and the lower extending seat back location 8.

Figure 2:
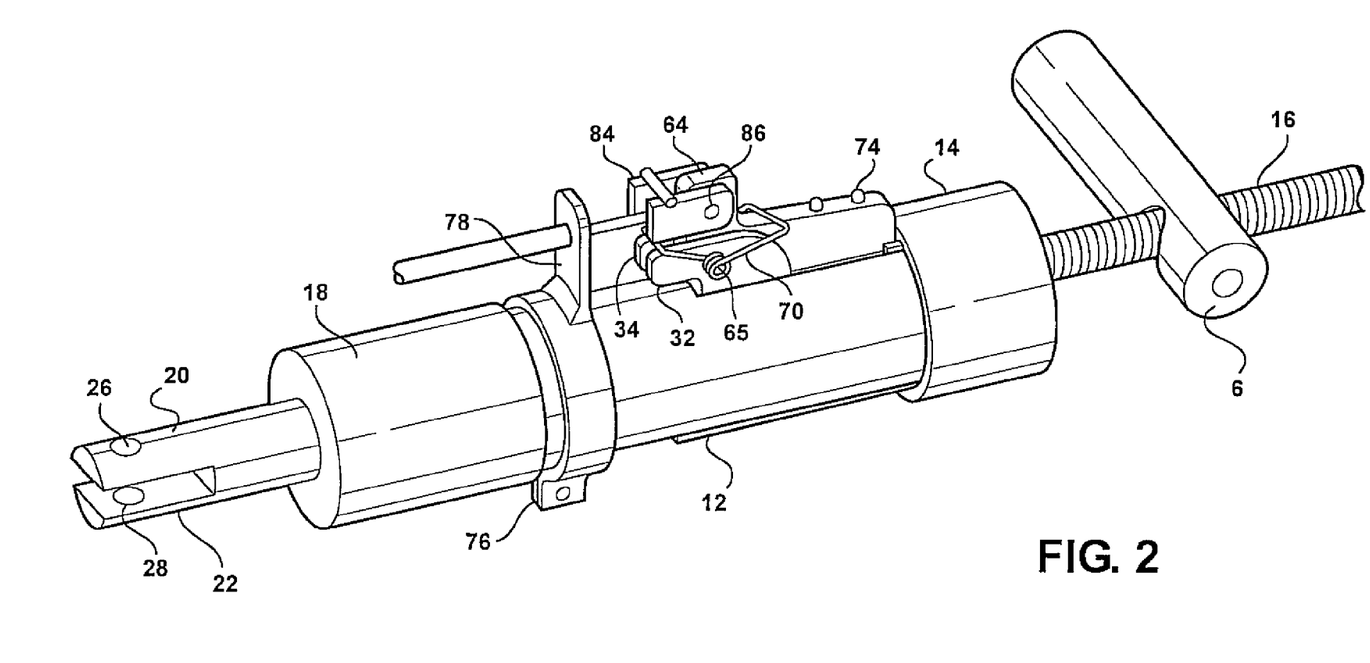
FIG. 2 is a rotated perspective view of the linear recliner assembly shown in FIG. 1.
Figure 3:
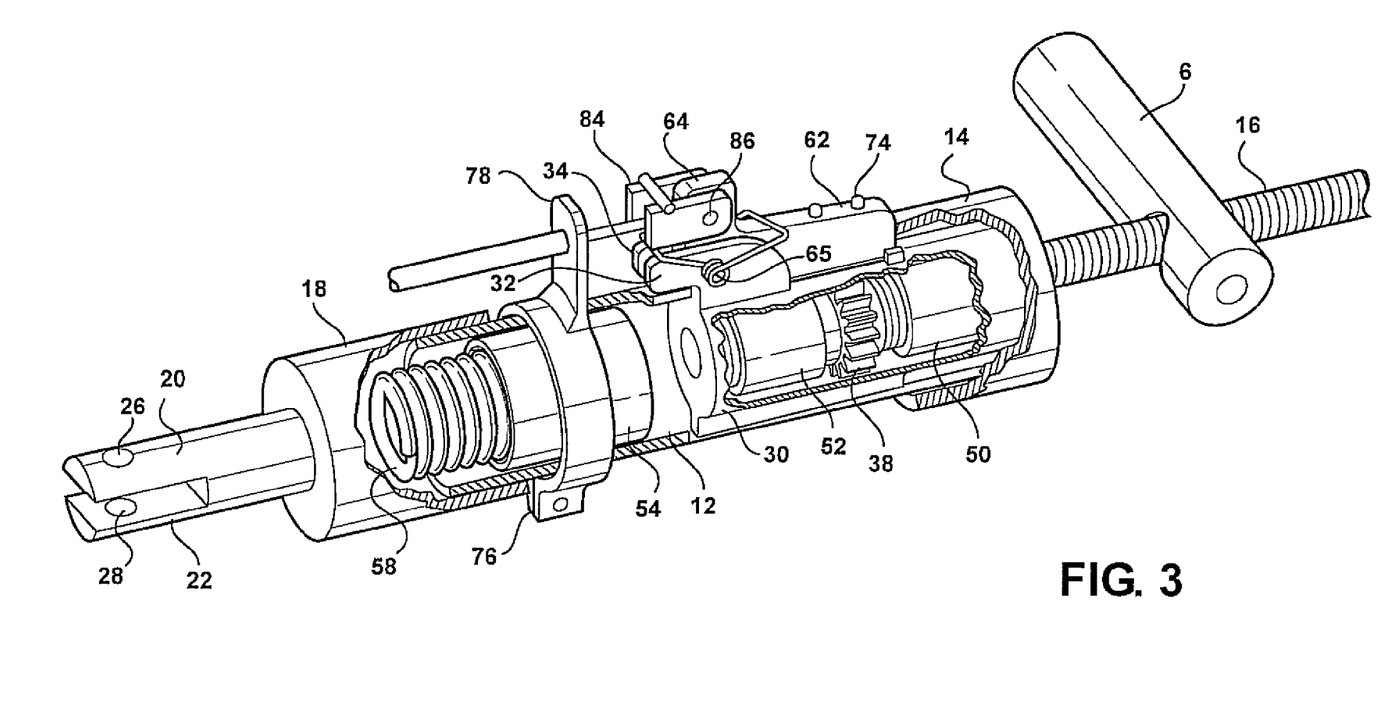
FIG. 3 is a partially transparent view of the linear recliner assembly shown in FIG. 2 and further illustrating the interior arrangement of the linearly displaceable threaded rod with end secured bushing, as well as the rotatable and trigger released gear stops for permitting displacement of the rod relative thereto and in a compressing engagement with the interior coil spring.

As further illustrated throughout the several views, a housing body exhibits a communicating interior extending between a first and second ends. More specifically, a central tubular portion 12 is provided with a first end cap 14 secured over the first end of the central tubular portion 12, the first end cap exhibiting an end face located and centrally positioned opening through which slidably displaces an exteriorly threaded (e.g. exhibiting such as a triple spiraling threaded profile) drive rod 16. A second end cap 18 is secured over the second end of the central tubular portion 12 and terminates in a pair of linear extending and spaced apart mounting portions, see at 20 and 22, these aligning with mounting portions of the pivotal seat back mounting location 8. A mounting pin 24 (see FIG. 1) extends crosswise through aligning apertures (see at 26 and 28 in each of FIGS. 2-4) defined in the mounting portions 20 and 22 as well as an aligning aperture (not shown) in the seat back location 8 for pivotally mounting the recliner assembly to the seat back as well as to the seat bottom.

Figure 4:
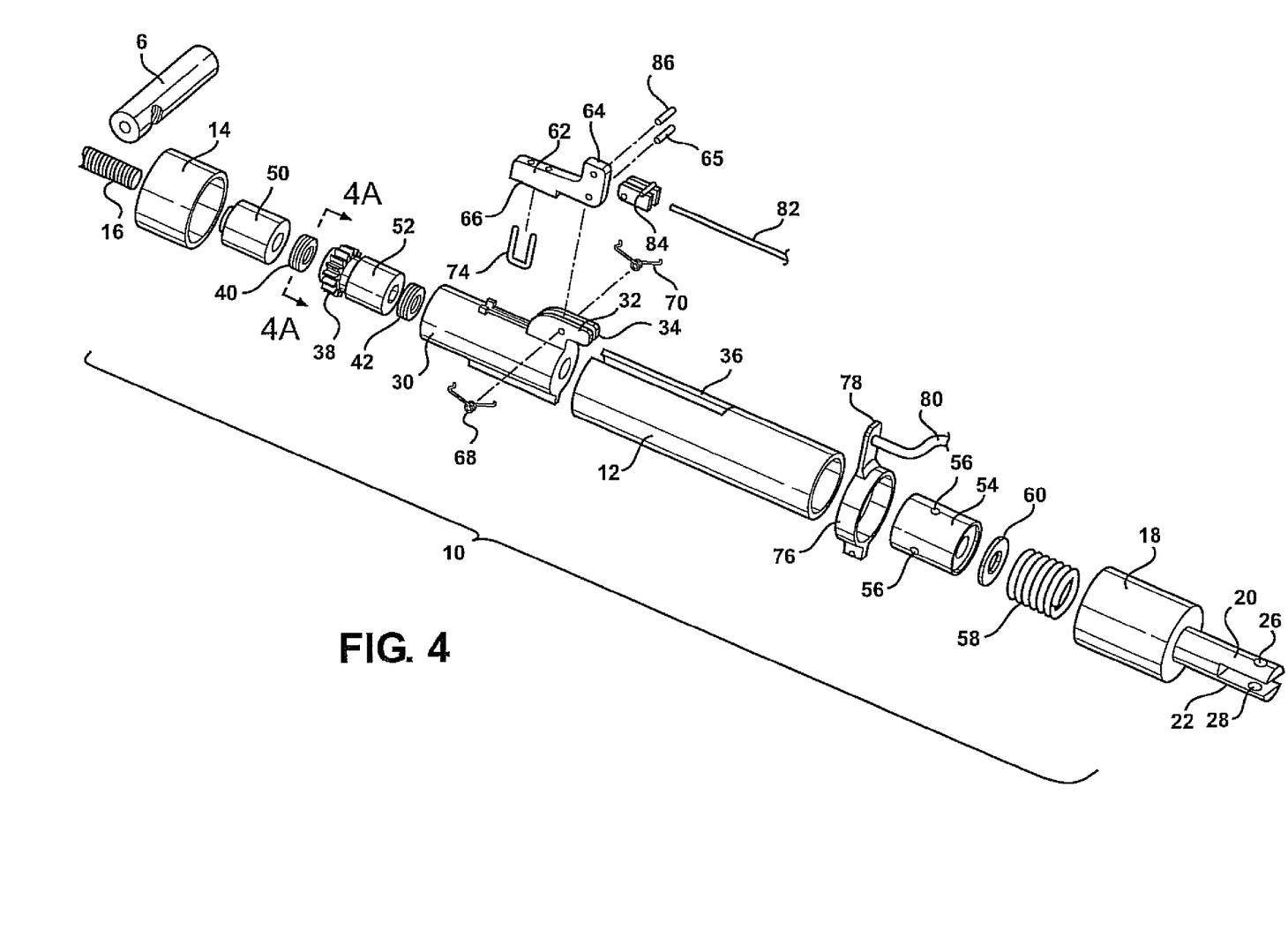
FIG. 4 is an exploded view of the linear recliner assembly.

A secondary (likewise cylindrical shaped) housing is provided at 30 (see as best shown in FIG. 4) and includes a trigger support, illustrated as a pair of spaced apart and upwardly/linearly projecting bridge portions 32 and 34. The dimensioning of the secondary cylindrical shaped housing 30 is such that it is capable of coaxially and slidably inserting within the open end of the main central housing 12, the housing 12 further exhibiting a linear extending recess 36 (again FIG. 4) extending from the associated end for a distance and corresponding to the dimension necessary to seat the linear projecting dimension of the trigger support portions 32 and 34.

A rotatable gear 38 (see as best shown in FIG. 4) is located at a fixed lineal position within the housing and receives the drive rod 16 in threadably inter-engaged fashion, the gear 38 illustrating an inner annular wall (not shown) upon which a plurality of spiral threads are inscribed, these engaging such as the triple threaded exterior spiral profile of the drive rod 16. As further shown, the gear 38 exhibits a plurality of outer peripherally and circumferentially extending teeth.

Figure 4A:
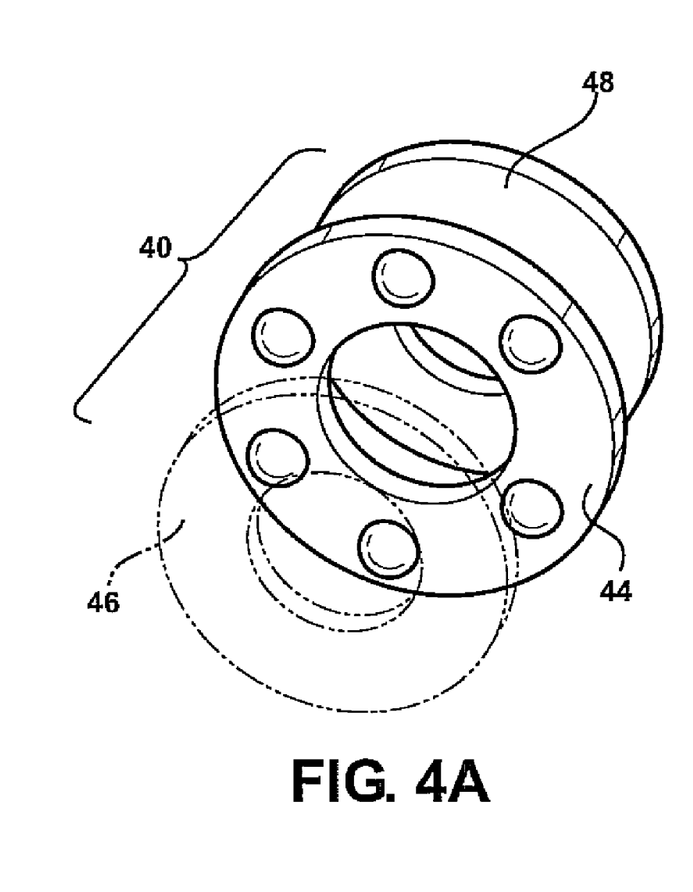
FIG. 4A is a sectional exploded illustration of a selected thrust bearing reference along line 4A-4A of FIG. 4.
Figure 4B:
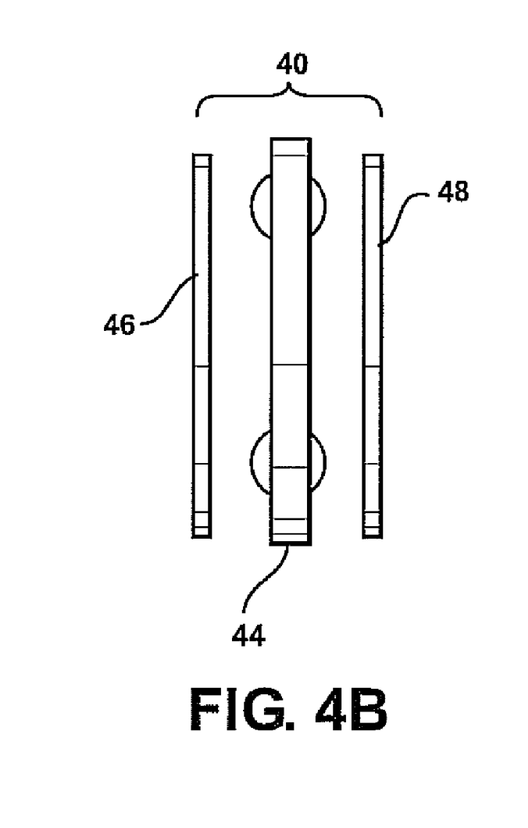
FIG. 4B is a rotated two dimensional view of the thrust bearing illustrated in exploded fashion in FIG. 4A and showing the central load supporting disk with annular arrayed and support bearings sandwiched between first and second cover portions.
Figure 5:
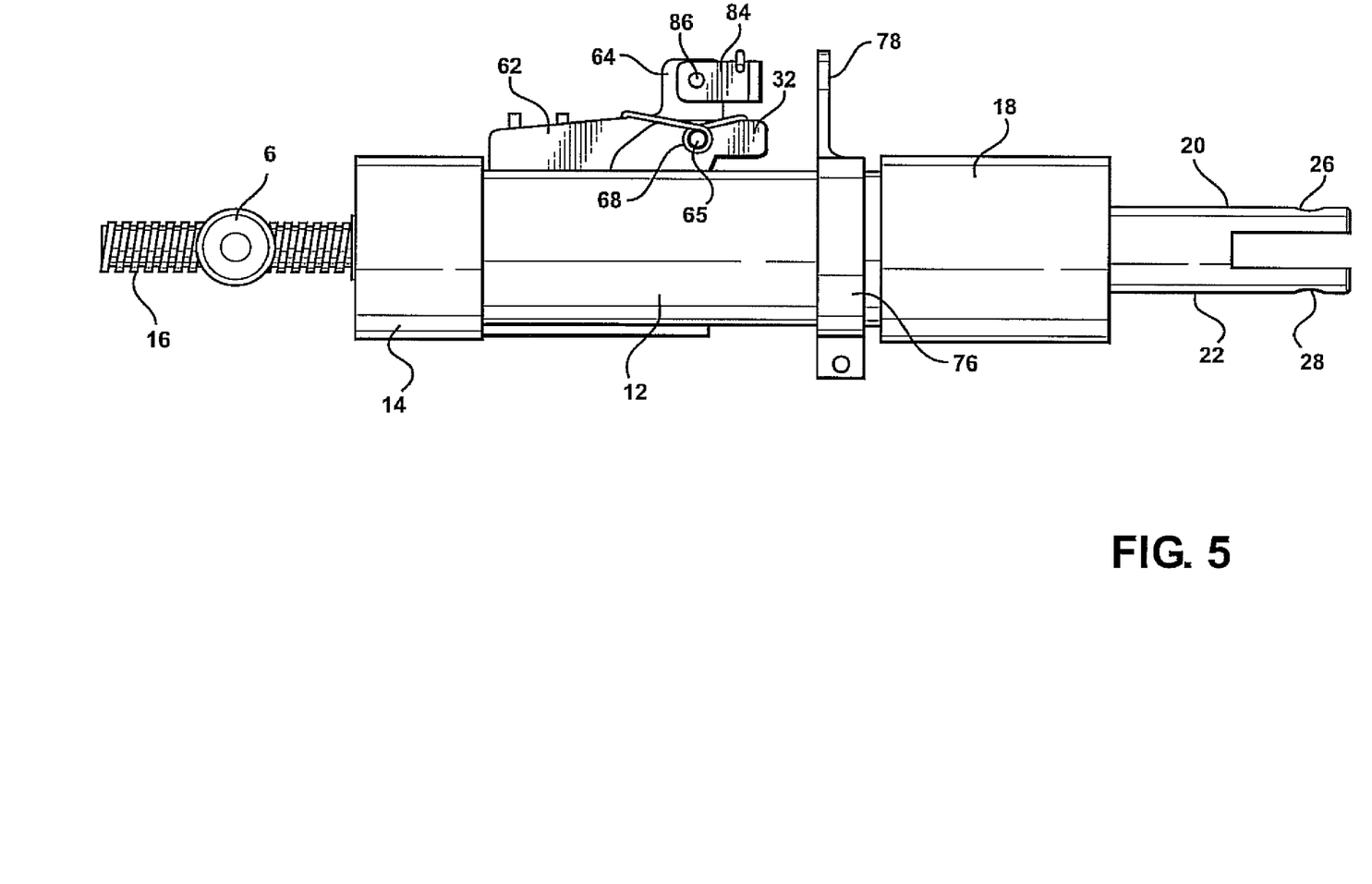
FIG. 5 is a side plan view of the recliner assembly as substantially shown in FIG. 1.

As best shown again in the exploded view of FIG. 4, as well the sectional exploded illustration of FIG. 4A and the rotated two dimensional view of FIG. 4B, a pair of (eccentric) load supporting thrust bearings 40 and 42 are arranged on either side of the stationary positioned and rotatable gear 38. Each of the thrust bearings, as best again shown by thrust bearing 40 in FIGS. 4A and 4B, includes a central load supporting disk portion 44 incorporating an annular array of individual bearings mounted thereto, the central disk 44 being sandwiched between a pair of outer disk coverings 46 and 48.

Additional features shown include a support bushing 50 positioned in end facing contact with selected thrust bearing 40 (see again FIG. 4) and so that the support bushing 50 is seated in abutting contact with the first end cap 14, with the threaded drive rod 16 projecting through aligning central apertures in the support bushing 50 and the end cap 14. Other features include a cylindrical shaped drive support portion 52, this securing to an end face of the rotatable gear 38. An end bushing 54 is secured to an interiorly extending end of the drive rod 16 (such as by fasteners including hex or pin screws, not shown, inserting in lateral projecting fashion through mounting apertures 56).

Figure 6:
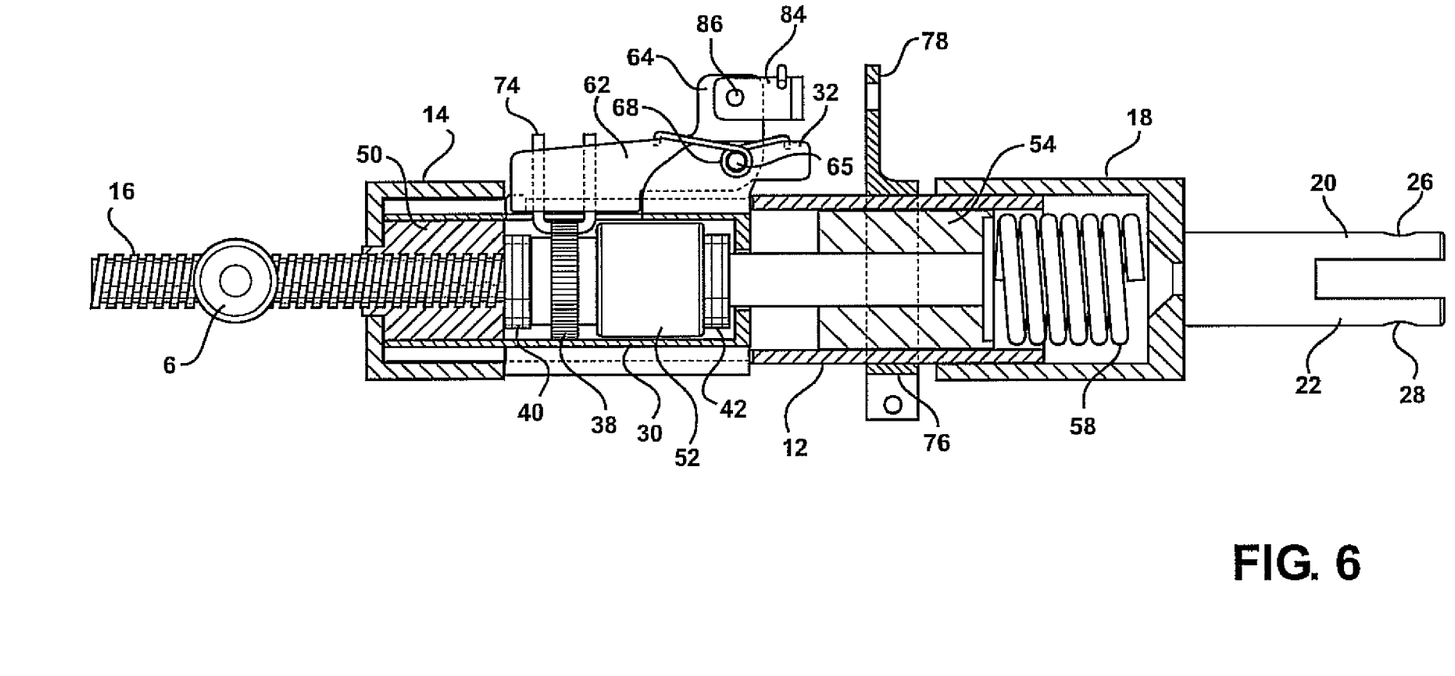
FIG. 6 is a cross sectional cutaway view of FIG. 5 and showing a fully inwardly displaced position of the drive rod and resultant maximum compressed condition of the interior coil spring corresponding to a reclined position of the seat back.

A coiled spring 58 is seated within the central housing 12, proximate the second end cap 18, and such that it biases against an end face of the end bushing 54. As shown in FIG. 4, a spacer washer 60 is sandwiched between the exposed face of the end bushing 54 and a terminating coil of the spring 58. Comparing the exploded view of FIG. 4 with the assembled and partially transparent view of FIG. 3 (as well as the cut-away line art illustration of FIG. 6) the manner in which the inner working components of the recliner assembly are mounted within the housing is clearly shown.

A trigger mechanism is provided as a main body 62 exhibiting a generally flattened planar shape and, as best shown in FIG. 4, includes a height increased forward portion 64 and a substantially planar rear underside 66. The main body 62 is pivotally secured at an exterior of the housing, such as by aligning the body 62 between the pair of spaced apart and upwardly/linearly projecting bridge portions 32 and 34.

A pair of torsion springs are shown at 68 and 70, these being secured upon opposing sides of a pivotal axis established by apertured locations in the forward portion 64 of the trigger body 62 and the portions 32 and 34 (see again FIG. 4) and through which is inserted a support pin 65 (FIG. 4) to pivotally support the trigger mechanism body 62 between the bridge portions 32 and 34 collectively defining the trigger support. A detent 74 is provided as (without limitation) a "U" shaped rigid wire and which is secured to a rear of the main trigger body 62 in downward extending fashion (as shown including the extending ends of the detent 74 mounting in vertical passageways in the trigger body and such that the detent extends from the planar rear underside 66).

In this fashion, the detent 74 is continually biased in downward engaging direction through the linear extending recess 36, and so that the interconnecting and crosswise extending end portion of the detent 74 seats within a valley location established between any succeeding pair of gear teeth to restrain rotation of the gear 38, thereby preventing resultant linear displacement of the drive rod 16. Additional features include a cable attachment bracket 76 secured to the central tubular portion 12, the bracket 76 including an upward terminating cable mount portion 78 arranged in proximity to the trigger mechanism 62 and to which is mounted a fixed outer sheath portion 80 of a cable.

An inner translating portion 82 extends from the outer sheath 80 and engages a clip 84 secured (such as by pins 86 in FIG. 4) to the upper projecting forward location 64 of the trigger mechanism 62. As further shown, the opposite extending legs associated with each of the torsional springs 68 and 70 include a first end biasing the bridge portions 32 and 34 and a second end downwardly biasing the main trigger body 62. The inner cable portion 82 is triggered (such as by a remotely located lever not shown) in a retracting direction toward the fixed outer sheath 80, in order to pivotally disengage the detent 74 from the gear teeth 38 to move the seat back between the reclined and upright position.

In use, and upon release of the detent 74 from the gear 38, an external reclining force applied to the seat back results in displacement of the housing (e.g. central body 12 with end caps 14 and 16) against the drive rod 16 (this resulting in an inwardly directed rotational to translational force delivered by the lowermost seat back portion 8 against the cylinder housing and as further shown by rotational arrow 88 in FIG. 1). This results in the drive rod 16 displacing against (and inwardly) relative to the housing, to bias the coil spring 58 (see as further best shown in FIG. 6. In this manner, the spring 58 influences the drive rod 16 in a reverse direction such that, upon release of said detent 74 when the seat back is in the reclined position, the spring 58 influences the seat back to reverse pivot to a returned upright position (again FIG. 1).

As previously explained, the drive rod 118 is displaced in the first reclining direction within the assembly housing, consistent with a seat occupant (not shown) physically reclining the seat back (i.e. by pushing against the seat back following triggering the release of the detent 74 from the gear 38) and so that the inner end bushing 54 secured to the drive rod 16 compresses against the interiorly positioned spring 58. Upon re-triggering the release of the gear stop elements, the compressed spring 58 acts as a reverse direction driving force, thereby influencing the drive rod 16 in a reverse linear extending fashion from the housing, again in order to turn influence the seat back to a reverse pivoting and upright position.

Having described our invention, other and additional preferred embodiments will become apparent to those skilled in the art to which it pertains and without deviating from the scope of the appended claims.

We claim:

1. A linear recliner assembly in use with a seat, the seat having a frame supporting a pivotal seat back relative to a seat bottom, the seat bottom including a rotating coupling exhibiting a threaded interior and which is mounted to a side location of the frame, the seat back including a lower most portion extending below a pivot about which the seat back rotates, said recliner assembly comprising:

an elongate and three dimensional housing having a communicating interior between a first end and a second end of said housing;

a drive rod supported in linearly displaceable fashion within said housing, said drive rod extending from said first end and being threadably displaceable through the interior of the rotating coupling;

said second end of said housing pivotally engaged to the lower most portion of the seat back;

said housing further comprising a central tubular portion, a first end cap secured to a first end of said central tubular portion, said first end cap exhibiting a central opening through which extends said drive rod, a second end cap secured to a second end of said central tubular portion, said second cap terminating in first and second spaced apart mounting portions and, upon aligning said mounting portions with the pivotally engaged location of the seat back, a pin being received in laterally inserting fashion for pivotally mounting said second end cap to the seat back;

a rotatable gear located at a fixed lineal position within said housing and through which said drive rod is threadably inter-engaged;

a trigger mechanism pivotally secured to an elevated exterior location of said housing and exhibiting a downwardly biased detent communicating through an opening in said housing to seat between succeeding teeth of said gear;

said central tubular portion further comprising a linear recess extending from said first end, said trigger mechanism further comprising a secondary housing coaxially inserting within said central tubular portion from said first end, said secondary housing further comprising a trigger support projecting from said linear recess; and a spring supported within said housing interior in contact with said drive rod, upon release of said detent from said gear an external reclining force applied to the seatback resulting in displacement of said housing against said drive rod to bias said spring, said spring influencing the drive rod in a reverse direction such that, upon release of said detent from said gear when the seatback is in the reclined position, said spring influencing the seat back to reverse pivot to a returned upright position.

2. The invention as described in claim 1, further comprising at least one torsion spring seated upon a pivot location established between said trigger mechanism and said trigger support, said spring including an extending leg biasing said detent toward said gear teeth.

3. The invention as described in claim 1, further comprising a cable attachment bracket secured to said housing in proximity to said trigger mechanism, a cable exhibiting an outer sheath and which is affixed to said cable attachment bracket, an inner translating portion extending from said outer sheath and engaging a clip secured to said trigger mechanism.

4. The invention as described in claim 1, further comprising a thrust bearing arranged at each of opposite sides of said rotatable gear.

5. The invention as described in claim 4, further comprising at least one support bushing arranged in linearly positioned and end facing contact with a selected one of said thrust bearings.

6. The invention as described in claim 5, further comprising a cylindrical shaped drive support portion secured to an end face of said rotatable gear.

7. The invention as described in claim 1, further comprising an end bushing supported within said housing and secured to a further and interiorly extending end of said drive rod, an exposed face of said end bushing biasing said spring in a compressing coiled fashion.

8. The invention as described in claim 7, further comprising a spacer washer sandwiched between said exposed face of said end bushing and a terminating coil of said spring.

9. The invention as described in claim 1, said detent further comprising a "U" shaped rigid wire secured to an extending underside surface of said trigger mechanism.

10. A linear recliner assembly in use with a seat, the seat having a frame supporting a pivotal seat back relative to a seat bottom, the seat bottom including a rotating coupling exhibiting a threaded interior and which is mounted to a side location of the frame, the seat back including a lower most portion extending below a pivot about which the seat back rotates, said recliner assembly comprising:

an elongate and three dimensional housing having a communicating interior between a first end and a second end of said housing;

a drive rod supported in linearly displaceable fashion within said housing, said drive rod extending from said first end and being threadably displaceable through the interior of the rotating coupling;

said second end of said housing pivotally engaged to the lower most portion of the seat back;

said housing further comprising a central tubular portion, a first end cap secured to a first end of said central tubular portion, said first end cap exhibiting a central opening through which extends said drive rod, a second end cap secured to a second end of said central tubular portion, said second end cap terminating in first and second spaced apart mounting portions and, upon aligning said mounting portions with the pivotally engaged location of the seat back, a pin being received in laterally inserting fashion for pivotally mounting said second end cap to the seat back;

said central tubular portion further comprising a linear recess extending from said first end, a secondary housing coaxially inserting within said central tubular portion from said first end, said secondary housing further comprising a trigger support projecting from said linear recess;

a rotatable gear located at a fixed lineal position within said housing and through which said drive rod is threadably inter-engaged, a thrust bearing being arranged at each of opposite sides of said rotatable gear;

a trigger mechanism pivotally secured to said trigger support and exhibiting a downwardly biased detent communicating through an opening in said housing to seat between succeeding teeth of said gear;

a cable attachment bracket secured to said housing in proximity to said trigger mechanism, a cable exhibiting an outer sheath and which is affixed to said cable attachment bracket, an inner translating portion extending from said outer sheath and engaging a clip secured to said trigger mechanism; and a coil spring supported within said housing interior, an end bushing supported within said housing and secured to a further and interiorly extending end of said drive rod exhibiting an exposed face biasing said spring in a compressing coiled fashion;

upon release of said detent from said gear, an external reclining force applied to the seatback results in displacement of said housing against said drive rod to compress said spring, said spring influencing the drive rod in a reverse direction such that, upon release of said detent from said gear when the seatback is in the reclined position, said spring influencing the seat back to reverse pivot to a returned upright position.

11. The invention as described in claim 10, further comprising a pair of torsion springs seated in opposing fashion upon a pivot location established between said trigger mechanism and said trigger support, said spring including an extending leg biasing said detent toward said gear teeth.

12. The invention as described in claim 10, further comprising at least one support bushing arranged in linearly positioned and end facing contact with a selected one of said thrust bearings.

13. The invention as described in claim 12, further comprising a cylindrical shaped drive support portion secured to an end face of said rotatable gear.

14. The invention as described in claim 10, further comprising a spacer washer sandwiched between said exposed face of said end bushing and a terminating coil of said spring.

15. The invention as described in claim 10, said detent further comprising a "U" shaped rigid wire secured to an extending underside surface of said trigger mechanism.

16. A linear recliner assembly in use with a seat, the seat having a frame supporting a pivotal seat back relative to a seat bottom, the seat bottom including a rotating coupling exhibiting a threaded interior and which is mounted to a side location of the frame, the seat back including a lower most portion extending below a pivot about which the seat back rotates, said recliner assembly comprising:

a housing having an open interior extending between a first end and a second end of said housing;

a drive rod supported in linearly displaceable fashion within said housing, said drive rod extending from said first end of said housing in threadably displaceable fashion through the rotating coupling;

said second end of said housing terminating in an end cap which is pivotally engaged to the lower most extending portion of the seat back;

said housing further comprising a linear recess extending from said first end, a secondary housing coaxially inserting within said first end, said secondary housing further comprising a trigger support projecting from said linear recess;

a rotatable gear located at a fixed lineal position within said housing, said gear being internally threaded for receiving therethrough said drive rod;

a trigger mechanism pivotally secured to said trigger support and exhibiting a downwardly biased detent communicating through an opening in said housing to seat between succeeding teeth of said gear; and a spring supported within said housing interior in contact with an end bushing displaceably secured to an internally extending end of said drive rod;

upon release of said detent from said gear, an external reclining force being applied to the seatback resulting in displacement of said housing against said drive rod to bias said spring, said spring influencing the drive rod in a reverse direction such that, upon release of said detent from said gear when the seat back is in the reclined position, said spring influencing the seatback to reverse pivot to a returned upright position.

* * * * *